United States Patent [19]
Hall

[11] Patent Number: 6,019,131
[45] Date of Patent: Feb. 1, 2000

[54] TAPERED ADJUSTABLE TAILPIECE

[75] Inventor: David C. Hall, Wheaton, Ill.

[73] Assignee: Sloan Valve Company, Franklin Park, Ill.

[21] Appl. No.: 09/096,094

[22] Filed: Jun. 11, 1998

[51] Int. Cl.[7] .................................................. F16L 37/00
[52] U.S. Cl. ........................... 137/613; 285/305; 251/148
[58] Field of Search .............................. 137/613; 251/45, 251/148; 285/305, 559, 554, 543

[56] References Cited

U.S. PATENT DOCUMENTS

| | | | |
|---|---|---|---|
| 3,659,632 | 5/1972 | Jonsson | 137/613 |
| 3,973,791 | 8/1976 | Porta et al. | 285/305 |
| 4,353,580 | 10/1982 | Houck . | |
| 4,427,218 | 1/1984 | Duvet et al. . | |
| 4,526,411 | 7/1985 | Bartholomew | 285/305 |
| 4,618,170 | 10/1986 | Fishburne . | |
| 4,707,262 | 11/1987 | Murken | 285/305 |
| 4,813,716 | 3/1989 | Lalikos et al. | 285/305 |
| 4,968,067 | 11/1990 | Whiteside | 285/305 |
| 5,011,193 | 4/1991 | Porte . | |

*Primary Examiner*—Denise L. Ferensic
*Assistant Examiner*—Joanne Y. Kim
*Attorney, Agent, or Firm*—Dorn, McEachran, Jambor & Keating

[57] ABSTRACT

A toilet room flush valve body is connected to a control stop body by means of a tail having a tapered outer surface. The larger end of the tail is connected to the control stop body and the smaller end of the tail is connectd to the flush valve body. The connection between the flush valve body and the tail is fixed, with the connection between the control stop body and the tail being adjustable. The connection between the control stop body and the tail includes a coupling nut threadedly connected to the stop body and having a flange which is inwardly directed toward the tail tapered outer surface. The stop body outlet has an end surface thereon which, with said control nut flange, define a chamber extending peripherally about the tail. A locking ring is positioned within the chamber and clamped by the flange against the end surface and the tail tapered outer surface to adjustably attach the tail to the stop body in a manner to prevent water pressure within the valve body from moving the valve body away from the stop body.

5 Claims, 1 Drawing Sheet

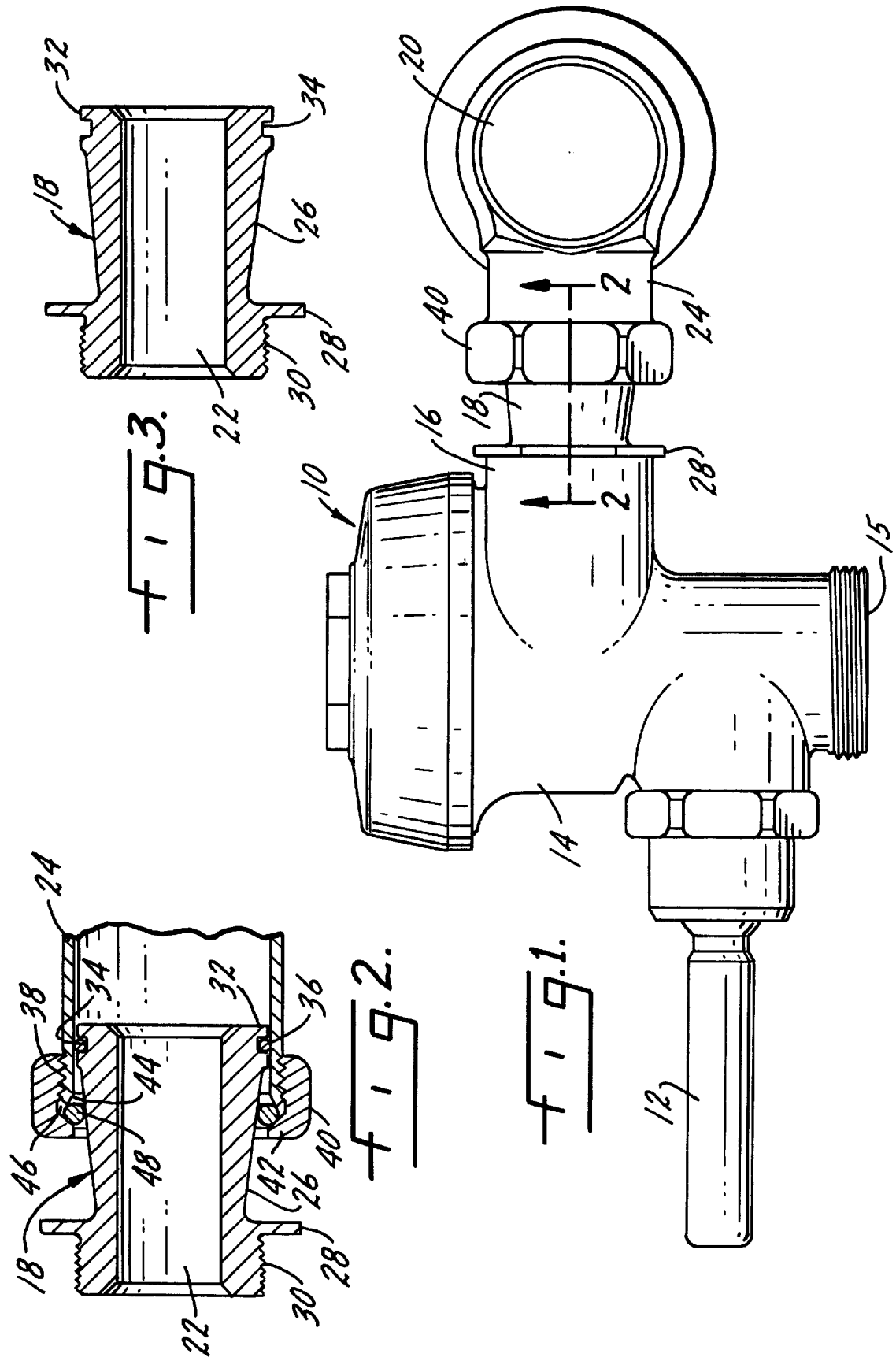

TAPERED ADJUSTABLE TAILPIECE

THE FIELD OF THE INVENTION

The present invention relates to toilet room flush valves of the type commonly used on toilets and urinals and more particularly to the tail that connects the flush valve body to the control stop body. As is known in the art, the control stop regulates the volume of water flowing to the flush valve.

The flush valve is mounted a fixed horizontal distance from the stop body and the flush valve body is vertically connected to a urinal or toilet. At times, water pressure to within the flush valve body will cause it to move away from the stop body, which causes the flush valve body to appear to be tilted. The present invention provides a tail which connects the control stop to the flush valve which prevents any movement of the flush valve body away from the control stop due to water pressure within the flush valve body, thereby maintaining the appropriate vertical alignment of the flush valve with the toilet and urinal.

SUMMARY OF THE INVENTION

The present invention relates to toilet room flush valves and more particularly to an adjustable tailpiece forming the connection between the flush valve body and the control stop body.

A primary purpose of the invention is to provide an adjustable connection between the control stop body and the flush valve body which will prevent tilting movement of the flush valve body due to water pressure therein.

Another purpose is a tapered tailpiece for use in connecting a flush valve body to a control stop body which, by virtue of its tapered outer surface, will function as a wedge flush valve body and provide a connection between the control stop and the flush valve which is adjustable at the control stop and fixed to the flush valve.

In FIG. 1, a flush valve is indicated generally at 10 and may be of the type sold by Sloan Valve Company, the assignee of the present application, under the trademark ROYAL. The flush valve 10 has an operating handle 12 extending outwardly from the valve body 14. The flush valve 10 is preferably of the diaphragm type, although the adjustable tailpiece is usable with any type of flush valve body.

The body 14 has an inlet connection 16 which will have an interior thread. There is an outlet 15 which will be connected to a toilet or urinal through a vacuum breaker. Connected to the flush valve body inlet 16 is a tail 18 which in turn is connected, at its larger diameter end, to a control stop 20. As indicated earlier, the control stop will have a valve member therein which may be used to either shut off or throttle the flow of water into the flush valve.

The tail 18, shown in detail in FIGS. 2 and 3, has an interior water passage 22 which connects the control stop outlet with the flush valve inlet. The control stop outlet is indicated at 24 and is cylindrical in cross section. The exterior of the tail 18 has a tapered section 26 bounded at one end by an annular flange 28, the flange being adjacent a cylindrical threaded area 30 which will attach to the internal threads of the flush valve inlet 16, thereby providing a fixed and rigid connection between the tail and the flush valve body.

The larger diameter end of the tail 18 has a cylindrical portion 32 which extends within the control stop body cylindrical portion 24. There is a groove 34 in the cylindrical portion 32 which carries a seal ring 36 which seals against the interior of the to prevent undesired movement of the flush valve body.

Another purpose of the invention is to provide a reliable, adjustable connection between a flush valve body and a control stop body which will prevent undesired movement of the flush valve body.

Other purposes will appear in the ensuing specification, drawings and claims.

BRIEF DESCRIPTION OF THE DRAWINGS

The invention is illustrated diagrammatically in the following drawings wherein:

FIG. 1 is a side view illustrating a toilet room flush valve connected to a control stop;

FIG. 2 is a section along plane 2—2 of FIG. 1; and

FIG. 3 is an axial section through the tapered tailpiece.

DESCRIPTION OF THE PREFERRED EMBODIMENT

It is well known in the art to use what is termed a control stop to both shut off and control the flow of water to the inlet of a toilet room flush valve. Such flush valves are commonly mounted on a water closet or on a urinal. There is a substantial amount of water pressure within the flush valve body during its use and at times that pressure can cause the flush valve body to move horizontally away from the control stop to the point where the flush valve body vertically tilts relative to the water closet or urinal to which it is attached. The tilting movement provides a misalignment, giving the appearance of an inoperable structure and may over a period of time cause water leakage from the connection to the water closet or urinal. The present invention is designed to prevent such tilting movement of the control stop cylindrical portion to prevent leakage at this point.

The cylindrical portion 24 has a threaded area 38 to which is attached a coupling nut 40. The nut 40 has an inturned flange 42 which, together with a tapered end 44 of the cylindrical portion 24, defines a chamber 46 within which is positioned a discontinuous locking ring 48.

When assembling the control stop, flush valve and tail, the tapered tail 18 is first fixed to the flush valve body inlet 16. The tail extends within the cylindrical portion of the control stop body outlet. The locking ring 48, which may be a split ring, encircles the tapered portion 26 of the tail 18 and will be clamped by the coupling nut 40 between the flange 42 of the nut and the end 44 of the control stop outlet 24. The coupling nut will clamp the locking ring down upon the exterior tapered surface which will prevent any outward movement of the tail from the control stop body, which outward movement might be caused by water pressure within the flush valve body. The effect of any water pressure within the flush valve body which might tend to move it away from the control stop is to drive the locking ring 48 more firmly into contact with the outer tapered surface of the tail 18 which thereby resists any such movement by the flush valve body.

Whereas the preferred form of the invention has been shown and described herein, it should be realized that there may be many modifications, substitutions and alterations thereto.

The embodiments of the invention in which an exclusive property or privilege is claimed are defined as follows:

1. In combination, a toilet room flush valve body, a control stop body, and a tail forming the connection therebetween, said valve body having a water inlet, said stop body having a water outlet and said tail having a water passage connecting said inlet and said outlet, said tail having an outer surface which is tapered throughout a substantial portion of its length, with one end of said tapered outer surface having a larger diameter than the other end of said tapered outer surface, with said larger diameter one end being adjustably connected to said stop body and said other end being fixed to said valve body, the connection between said stop body and tail including a coupling nut threadedly connected to said stop body and having a flange thereon which is inwardly directed toward said tail, said stop body outlet having an end surface thereon, which, with said flange define a chamber extending peripherally about said tail, a locking ring positioned within said chamber and clamped by said flange against said end surface and said tail tapered outer surface to adjustably attach said tail to said stop body in a manner to prevent water pressure within said valve body from moving said valve body away from said stop body, said tail having an exterior threaded surface at said other end, which exterior threaded surface connects the tail to said valve body, an outwardly extending annular flange at said other end of said tapered outer surface, which flange bears against said valve body inlet, when said tail is fixed to said valve body, said tail tapered outer surface extending from said tail annular flange beyond said chamber.

2. The combination of claim 1 wherein said stop body outlet has a cylindrical portion, with said end surface being at the end thereof, said coupling nut being threadedly attached to said cylindrical portion.

3. The combination of claim 2 wherein said tail extends within said stop body cylindrical portion and has a seal ring positioned about the exterior thereof which is in sealing contact with an interior surface of said cylindrical portion.

4. The combination of claim 3 wherein said tail has a cylindrical portion at said one end, with said tail cylindrical portion extending within said stop body cylindrical portion, and said tail seal ring being located on said tail cylindrical portion.

5. The combination of claim 1 wherein said locking ring is discontinuous.

* * * * *